(12) United States Patent
Umakoshi et al.

(10) Patent No.: US 8,070,086 B2
(45) Date of Patent: Dec. 6, 2011

(54) WEBBING WINDING DEVICE

(75) Inventors: Tomonari Umakoshi, Aichi-ken (JP); Shinji Mori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 12/884,087

(22) Filed: Sep. 16, 2010

(65) Prior Publication Data
US 2011/0006147 A1 Jan. 13, 2011

Related U.S. Application Data

(63) Continuation of application No. PCT/JP2010/060403, filed on Jun. 18, 2010.

(30) Foreign Application Priority Data
Jun. 19, 2009 (JP) .................... 2009-146463

(51) Int. Cl.
*B65H 75/48* (2006.01)
(52) U.S. Cl. .................... 242/374; 242/379.2
(58) Field of Classification Search ............ 242/374, 242/376, 379.1, 379.2, 382.2
See application file for complete search history.

(56) References Cited

U.S. PATENT DOCUMENTS

| | | | | |
|---|---|---|---|---|
| 7,533,842 B2* | 5/2009 | Saito et al. | ............... | 242/390.9 |
| 7,686,243 B2* | 3/2010 | Jabusch et al. | ............... | 242/379.1 |
| 7,934,673 B2* | 5/2011 | Saito et al. | ............... | 242/374 |
| 7,980,503 B2* | 7/2011 | Saito et al. | ............... | 242/382.1 |
| 2006/0249615 A1 | 11/2006 | Mori et al. | | |
| 2007/0246593 A1* | 10/2007 | Asagiri et al. | ............... | 242/390 |
| 2007/0284870 A1* | 12/2007 | Saito et al. | ............... | 280/806 |
| 2008/0252060 A1* | 10/2008 | Saito et al. | ............... | 280/806 |
| 2010/0314478 A1* | 12/2010 | Saito et al. | ............... | 242/374 |
| 2011/0006147 A1* | 1/2011 | Umakoshi et al. | ............... | 242/374 |
| 2011/0121122 A1* | 5/2011 | Umakoshi | ............... | 242/389 |

FOREIGN PATENT DOCUMENTS

| | | |
|---|---|---|
| JP | 2004-42788 A | 2/2004 |
| JP | 2004-74860 A | 3/2004 |
| JP | 2006-69394 A | 3/2006 |

* cited by examiner

*Primary Examiner* — Sang Kim
(74) *Attorney, Agent, or Firm* — Roberts Mlotkowski Safran & Cole, P.C.

(57) ABSTRACT

A webbing winding device includes a clutch mechanism interposed between a spool and an output shaft of a motor and has a simple structure and high operability. In an interference piece that has an interference portion interfering with a connection pawl when an input gear of a clutch is rotated in the winding direction, a base portion is disposed between an outer retaining ring and an inner retaining ring formed at a gear box, and the base portion comes into press contact with an inner peripheral portion of the outer retaining ring and an outer peripheral portion of the inner retaining ring. The interference portion keeps interfering with the connection pawl until a pressing force more than a maximum static frictional force generated between the inner peripheral portion of the outer retaining ring and the outer peripheral portion of the inner retaining ring, and the base portion is applied to the interference portion, thereby rotating the connection pawl.

3 Claims, 9 Drawing Sheets

WEBBING WINDING DEVICE

TECHNICAL FIELD

The present invention relates to a webbing winding device that winds and accommodates a webbing belt constituting a seat belt device of a vehicle.

BACKGROUND ART

The following Patent Document 1 discloses a webbing winding device that removes slight looseness, or so-called "slack" of a webbing belt in such a manner that a motor is operated when a distance with respect to an obstacle in front of a vehicle is less than a predetermined value, and a spool is rotated in the winding direction by a driving force of the motor so that the webbing belt fastened to a passenger's body is wound.

In the webbing winding device, a clutch is interposed between the spool and the output shaft of the motor. The clutch includes a base plate which is rotated by a transmitted driving force of the motor and a rotary disk which is rotatable relative to the base plate. When the base plate is rotated in the winding direction relative to the rotary disk, a pawl provided at the base plate is pressed by a pressing piece provided at the rotary disk to be rotated, and the pawl meshes with external teeth of an adapter which is not rotatable relative to the spool. Accordingly, a rotation force in the winding direction of the base plate rotated by the driving force of the motor is transmitted to the spool via the adapter, thereby rotating the spool in the winding direction.

Further, the webbing winding device includes a brake mechanism that is operated by the driving force of the motor. When the brake mechanism is operated by the driving force of the motor, a brake piece slides on a friction ring of the clutch so as to suppress the friction ring from being rotated in the winding direction. When the rotation of the friction ring in the winding direction is suppressed, the rotation of the rotary disk in the winding direction is suppressed. Accordingly, relative rotation occurs between the base plate that is rotated in the winding direction by the driving force of the motor and the rotary disk that is suppressed from being rotated in the winding direction, and as described above, the pawl is rotated so as to mesh with the external teeth of the adapter.

[Patent Document 1] Japanese Patent Application Laid-Open No. 2004-42788.

DISCLOSURE OF THE INVENTION

Problems that the Invention is to Solve

Likewise, in the structure disclosed in Patent Document 1, the clutch that is adapted to disconnect the output shaft of the motor from the spool in a normal state and to connect the output shaft of the motor to the spool when the motor is driven, or the brake mechanism that further makes sure the operation of the clutch has complex structure. Due to this configuration, the number of components required for such mechanisms is large, which causes an increase in the cost.

The invention is contrived in consideration of such circumstances, and an object of the invention is to provide a webbing winding device in which a structure of a clutch mechanism is simple and operability of the clutch mechanism interposed between a spool and an output shaft of a motor is high.

Means for Solving the Problems

A webbing winding device of the invention described in claim 1 includes a spool to which a longitudinal direction base end side of a band-shaped webbing belt is fixed and which rotates in a winding direction so that the webbing belt is wound from the longitudinal direction base end side; a frame which directly or indirectly supports the spool; a motor which is operated to rotate an output shaft; a rotating body which rotates when rotation of the output shaft is transferred thereto; a rotation transmission member which is provided at the rotating body so as to be displaceable relative to the rotating body, to thereby displace so as to be directly or indirectly connected to the spool, and transmit rotation of the rotating body to the spool; a retaining member which includes a pair of retaining portions facing each other in a rotary radial direction of the rotating body and is mounted to the frame; and an interference member which is provided between the pair of retaining portions so as to be elastically retained by the retaining portions in a press contact state and to be moved in a rotary circumferential direction of the rotating body by being guided by the pair of retaining portions when receiving a predetermined magnitude or more of a pressing force in the rotary circumferential direction, and which is disposed on the side of the rotation transmission member in a rotary direction of the rotating body so as to interfere with the rotation transmission member or to release interference with respect to the rotation transmission member to thereby permit displacement of the rotation transmission member in a direction in which the rotation transmission member is connected to the spool when the rotating body rotates in the winding direction.

In the webbing winding device of the invention described in claim 1, the output shaft of the motor is rotated when the motor is operated. The rotation of the output shaft of the motor is transmitted to the rotating body so as to rotate the rotating body. The rotating body is provided with the rotation transmission member, and when the rotating body is rotated, the rotation transmission member is rotated in the winding direction together with the rotating body.

On the other hand, the retaining member is mounted to the frame supporting the spool. The retaining member is provided with the pair of retaining portions that faces each other in the rotary radial direction of the rotating body, and the interference member is disposed and retained between the retaining portions. The interference member is located on the side of the rotation transmission member along the rotary circumferential direction of the rotating body. If it is assumed that the initial state of the interference member is the state where the interference member does not interfere with the rotation transmission member, when the rotating body is rotated in the winding direction, the rotation transmission member is interfered with the interference member so that the displacement is permitted (the displacement permission state). On the contrary, if it is assumed that the initial state of the interference member is the state where the interference member interferes with the rotation transmission member, when the rotating body is rotated in the winding direction, the interference of the interference member with respect to the rotation transmission member is released so that the displacement is permitted (the displacement permission state).

Likewise, when the interference member is changed from the initial state to the displacement permission state, the displacement of the rotation transmission member with respect to the rotating body is permitted. Accordingly, the rotation transmission member displaces with respect to the rotating body, and hence the rotation transmission member is directly or indirectly connected to the spool. When the rotation transmission member is connected to the spool, the rotating body is connected to the spool via the rotation transmission member, and the rotation force of the rotating body is transmitted to the spool, thereby rotating the spool in the winding direction. Likewise, when the spool is rotated in the winding direction, the webbing belt fastened to the passenger's body is wound around the spool from the longitudinal direction base end side of the webbing belt, thereby removing slight looseness, or so-called "slack" of the webbing belt.

Here, in the webbing winding device according to the invention, as described above, since the configuration for displacing the rotation transmission member in order to connect the rotation transmission member for transmitting the rotation force of the rotating body to the spool is realized by the retaining member having the pair of retaining portions facing each other in the rotary radial direction of the rotating body and the interference member, the structure is simple and the number of components is small, which may realize a decrease in the cost. Further, since the interference member is retained while coming into press contact with the retaining portion of the retaining member, when the rotation transmission member is rotated together with the rotating body, the interference member reliably interferes with the rotation transmission member, and thus the rotation transmission member displaces with respect to the rotating body to be connected to the spool, thereby obtaining good operability.

Further, since the interference member is retained while coming into press contact with the pair of retaining portions, when the rotation transmission member presses the interference member in the winding direction at the magnitude more than the maximum static frictional force between the interference member and the pair of retaining portions, the interference member is guided by the pair of retaining portions to be rotated. Accordingly, the rotation of the rotation transmission member in the winding direction, and further the rotation of the rotating body in the winding direction are not particularly regulated.

Furthermore, since both the pair of retaining portions retaining the interference member are provided at the retaining member, dimension errors or the like between both retaining portions rarely occur. Due to this configuration, a large difference in the magnitude of the maximum static frictional force between the interference member and the pair of retaining portions does not occur.

Moreover, when the interference member is retained by plural independent members, the interference member is not reliably retained until the assembling of the members is completed, whereby the assembling may be difficult. However, in the webbing winding device according to the invention, since both the pair of retaining portions retaining the interference member are formed at the retaining member as described above, the retaining member may be assembled in the frame while the interference member is retained by the pair of retaining portions, thereby obtaining good assembling workability.

The webbing winding device of the invention described in claim 2 as described in the invention described in claim 1, includes: a press contact portion which is formed in a flat plate shape and is curved against elasticity of the press contact portion while being disposed between the pair of retaining portions so that both longitudinal direction end sides come into press contact with one of the pair of retaining portions; and an interference portion which is formed in a plate shape having a thickness direction thereof along the thickness direction of the press contact portion and extends from the press contact portion so that the interference portion is able to interfere with the rotation transmission member.

In the webbing winding device of the invention described in claim 2, the interference portion of the interference member, having the press contact portion disposed between the pair of retaining portions in the curved state, faces the rotation transmission member along the rotary circumferential direction of the rotating body. Due to this configuration, when the rotation transmission member is rotated together with the rotating body so that the rotation transmission member is interfered with the interference member in the state where the rotation transmission member is not interfered with the interference member, the interference portion of the interference member is pressed by the rotation transmission member.

However, since the press contact portion comes into press contact with one of the pair of retaining portions, the interference member is pressed by the rotation transmission member so as not to be moved until the magnitude of the pressing force that the rotation transmission member presses the interference member becomes more than the maximum static frictional force between the press contact portion and one of the retaining portions. Accordingly, the interference portion of the interference member keeps interfering with the rotation transmission member until the interference member is moved, and the rotation transmission member displaces with respect to the rotating body by the interference of the interference portion. Therefore, the rotation transmission member is directly or indirectly connected to the spool, or the direct or indirect connection between the rotation transmission member and the spool is released.

Here, in the configuration in which the press contact portion is formed so that the press contact portion is curved in advance, and the press contact portion is disposed between the pair of retaining portions, the magnitude of the force with which the press contact portion presses one of the retaining portions while the press contact portion is disposed between the pair of retaining portions changes due to the curved state of the press contact portion, and further the magnitude of the maximum static frictional force between the press contact portion and one of the retaining portions changes. Therefore, in such a configuration, the curved state of the press contact portion needs to be adjusted.

On the contrary, in the webbing winding device according to the invention, the press contact portion of the interference member is formed in the flat plate shape, the press contact portion is curved against its elasticity while being disposed between the pair of retaining portions, and the press contact portion comes into press contact with one of the pair of retaining portions in the curved state. Likewise, since the press contact portion to be disposed between the pair of retaining portions is formed in the flat plate shape, particular adjustment is not required and errors rarely occur, which realizes a decrease in the cost.

In the webbing winding device of the invention described in claim 3 as described in the invention described in claim 1 or claim 2, the pair of retaining portions is uprightly formed from the retaining member in a rotary shaft direction of the rotating body, an abutment portion is provided at the interference member so that a surface of the abutment portion contacts with a front end of at least one of the pair of retaining portions in an upright direction from the retaining member, and a length in the upright direction from an end portion of the interference member on the opposite side from the front ends of the pair of retaining portions in the upright direction to the contact surface of the abutment portion contacting with the front ends of the pair of retaining portions is set to be shorter than a length of the pair of retaining portions in the upright direction.

In the webbing winding device of the invention described in claim 3, the interference member disposed between the pair of retaining portions uprightly formed from the retaining member is provided with the abutment portion, and the abutment portion contacts with the front end of one of the pair of retaining portions (that is, the front end of the retaining portion uprightly formed from the retaining member in the upright direction).

Here, while the interference member is disposed between the pair of retaining portions, the length in the upright direction of the retaining portion from the end portion of the interference member on the opposite side from the front ends of the pair of retaining portions in the upright direction to the surface of the abutment portion contacting the retaining portion is shorter than the dimension of the retaining portion uprightly formed from the retaining member (the height of the retaining portion from the retaining member). Due to this configuration, since the abutment portion contacts with the retaining portion, the interference member does not contact with the base end of the retaining portion of the retaining member. Accordingly, even when the interference member is pressed by the rotation transmission member to be rotated, the interference member between the pair of retaining portions is not caught by the retaining member.

Effects of the Invention

As described above, in the webbing winding device according to the present invention, the operability of the clutch mechanism may be made to be high, and the structure of the clutch mechanism may be made to be simple.

BEST MODE FOR CARRYING OUT THE INVENTION

Configuration of First Exemplary Embodiment

Figure 1:
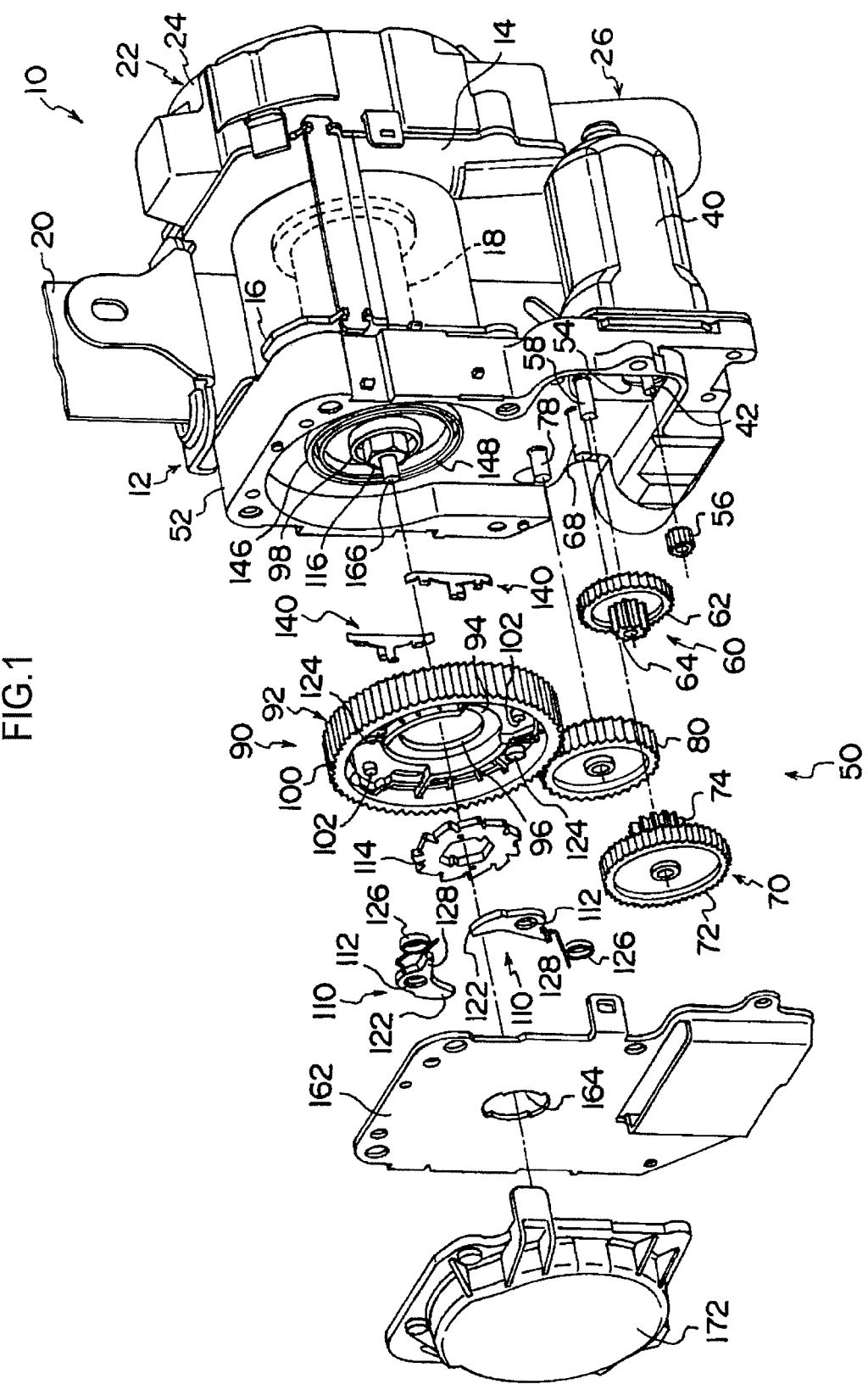
FIG. 1 is an exploded perspective view illustrating a configuration of a main part of a webbing winding device according to a first exemplary embodiment of the invention.

The configuration of a webbing winding device 10 according to a first exemplary embodiment of the invention is shown in the exploded perspective view of FIG. 1.

As shown in the drawing, the webbing winding device 10 includes, for example, a frame 12 that is fixed to a vehicle body constituting member such as a frame member or a reinforcement member of a vehicle. The frame 12 includes bridge plates 14 and 16 that face each other in the front and rear direction of the vehicle while being attached to the vehicle body.

A spool 18 is provided between the bridge plates 14 and 16. The spool 18 is formed in a substantially cylindrical shape, the axial direction of which is aligned with the opposite direction between the bridge plates 14 and 16. A longitudinal direction base end portion of a webbing belt 20, which is formed in an elongated band shape, is fixed to the spool 18. When the spool 18 rotates in the winding direction, that is, one direction about its axis, the webbing belt 20 is wound and accommodated from its longitudinal direction base end side. For example, when a passenger pulls the webbing belt 20 in order to fasten the webbing belt 20 to his/her body, the webbing belt 20 wound around the spool 18 is extracted, and the spool 18 rotates in the extracting direction which is the reverse direction of the winding direction.

A torsion shaft (not shown) is provided inside the spool 18. The torsion shaft is formed as a bar-shaped member, the axial direction of which is aligned with the axial direction of the spool 18. The torsion shaft is connected to the spool 18 while the coaxial rotation relative to the spool 18 is not permitted on the side of the bridge plate 16 which is further frontward than the end portion of the bridge plate 14.

A housing 24 of a lock mechanism 22 as a lock member is provided at the opposite side from the bridge plate 16 in the bridge plate 14 so as to be attached to the bridge plate 14, and the end portion of the torsion shaft on the side of the bridge plate 14 is directly or indirectly supported to the housing 24 so as to be rotatable about the axis of the spool 18. The housing 24 accommodates various components constituting a so-called "VSIR mechanism" that is operated when the vehicle enters a rapid deceleration state and regulates the end portion of the torsion shaft on the side of the bridge plate 14 from rotating in the extracting direction in accordance with its operation, and various components constituting a so-called "WSIR mechanism" that is operated when the torsion shaft abruptly rotates in the extracting direction and regulates the end portion of the torsion shaft on the side of the bridge plate 14 from rotating in the extracting direction in accordance with its rotation.

A pretensioner 26 as a compulsory tension member is provided at the bridge plate 14 on the opposite side from the bridge plate 16. The pretensioner 26 is operated when the vehicle enters a rapid deceleration state, and is adapted to apply a rotation force in the winding direction to the spool 18 or the end portion of the torsion shaft on the side of the bridge plate 14 and to compulsorily rotate the spool 18 in the winding direction in accordance with its operation.

On the other hand, a motor 40 is provided below the spool 18 between the bridge plates 14 and 16. The motor 40 is electrically connected via an ECU as a control member (not shown) to a battery that is mounted to the vehicle and a forward monitoring device such as a radar device that measures a distance with respect to another vehicle traveling in front of the own vehicle or an obstruction in front of the own vehicle. When the ECU determines that the distance with respect to another vehicle traveling in front of the own vehicle or an obstacle in front of the own vehicle is less than a predetermined value on the basis of electrical signals output from the forward monitoring device, the ECU operates the motor 40. The motor 40 has a configuration in which the axial direction of an output shaft 42 is aligned with the axial direction of the spool 18, and the front end side of the output shaft 42 protrudes to the outside of the bridge plate 16 (the opposite side from the bridge plate 14 of the bridge plate 16) via a perforation hole (not shown) formed at the bridge plate 16.

A driving force transmission mechanism 50 is provided at the bridge plate 16 on the opposite side from the bridge plate 14. The driving force transmission mechanism 50 includes a gear box 52 as an attached retaining member that is provided at the bridge plate 16 so as to be located on the opposite side from the bridge plate 14 of the bridge plate 16. The gear box 52 is formed in a concave shape that is opened to the opposite side from the bridge plate 16. A hole portion 54 is formed at the bottom portion of the gear box 52, and the output shaft 42 of the motor 40 passing through the hole portion of the bridge plate 16 is disposed inside the gear box 52 via the hole portion 54.

A gear 56, which is an external tooth gear and a spur gear, is attached to the front end side of the output shaft 42 disposed inside the gear box 52 so as to be coaxially integrated with the output shaft 42. A support shaft 58 is formed at the bottom portion of the gear box 52 on the side of the gear 56. The axial direction of the support shaft 58 is aligned with the axial direction of the output shaft 42. A two-staged gear 60 is supported by the support shaft 58 so as to be rotatable about the support shaft 58. The two-staged gear 60 includes a large diameter gear 62 which is an external tooth gear and a spur gear. The large diameter gear 62 has a diameter larger than that of the gear 56, and has more teeth than those of the gear 56, where the large diameter gear meshes with the gear 56. A small diameter gear 64, which is an external tooth gear and spur gear and has a diameter smaller than that of the large diameter gear 62, is provided at the side of the large diameter gear 62 in the axial direction so as to be coaxially integrated with the large diameter gear 62.

A support shaft 68 is formed at the bottom portion of the gear box 52 on the side of the two-staged gear 60 in the rotary radial direction. The axial direction of the support shaft 68 is aligned with the axial direction of the support shaft 58 or the output shaft 42. A two-staged gear 70 is supported by the support shaft 68 so as to be rotatable about the support shaft 68. The two-staged gear 70 includes a large diameter gear 72 which is an external tooth gear and a spur gear. The large diameter gear 72 has a diameter larger than that of the small diameter gear 64, and has more tooth than those of the small diameter gear 64, where the large diameter gear meshes with the small diameter gear 64. A small diameter gear 74, which is an external tooth gear and spur gear and has a diameter smaller than that of the large diameter gear 72, is provided at the side of the large diameter gear 72 in the axial direction so as to be coaxially integrated with the large diameter gear 72.

A support shaft 78 is formed at the bottom portion of the gear box 52 on the side of the two-staged gear 70 in the rotary radial direction. The axial direction of the support shaft 78 is aligned with the axial direction of the output shaft 42 and the support shafts 58 and 68. A gear 80, which is an external tooth gear and a spur gear, is supported by the support shaft 78 so as to be rotatable about the support shaft 78. The gear 80 has a diameter larger than that of the small diameter gear 74, and has more teeth than those of the small diameter gear 74, where the gear meshes with the small diameter gear 74.

A clutch 90 is provided at the side of the gear 80 in the rotary radial direction. The clutch 90 includes an input gear 92 as a rotating body. The input gear 92 includes a bottom wall portion 94. A circular hole 96 is formed at the bottom wall portion 94. An annular support portion 98 is formed at the bottom portion of the gear box 52 so as to correspond to the circular hole 96. The circular hole 96 is uprightly formed from the bottom portion of the input gear 92 toward the opposite side from the bridge plate 14. In addition, the support portion 98 is formed so that its axis is substantially aligned with the axis of the spool 18.

The support portion 98 passes through the circular hole 96, and supports the bottom wall portion 94, that is, the input gear 92 so as to be rotatable about the axis of the support portion 98. A gear portion 100, which is an external tooth gear and a spur gear, is formed at the outer peripheral portion of the bottom wall portion 94. The gear portion 100 is formed so as to be coaxial with the circular hole 96 of the bottom wall portion 94, and has a diameter larger than that of the gear 80 and more teeth than those of the gear 80, where the gear portion meshes with the gear 80. As described above, since the gear 80 is mechanically connected to the gear 56 provided at the output shaft 42 of the motor 40 via the two-staged gears 60 and 70, when the motor 40 is operated and the output shaft 42 is rotated by the driving force, the rotation of the output shaft 42 is decelerated, and the decelerated rotation is transmitted to the gear portion 100, thereby rotating the gear portion 100, that is, the input gear 92.

On the other hand, a pair of support shafts 102 is provided inside the gear portion 100. Each of the support shafts 102 is formed so that its axial direction is aligned with the axial direction of the circular hole 96, and protrudes from the bottom wall portion 94 of the input gear 92 toward the opposite side from the bridge plate 16. Such support shafts 102 are formed so as to face each other with the axis of the circular hole 96 interposed therebetween. A connection pawl 110 as a rotation transmission member is provided at each of the support shafts 102. A circular hole 112 is formed at each of the connection pawl 110. The support shaft 102 passes through the circular hole 112, and each of the connection pawl 110 is supported by the corresponding circulation hole 112 so as to be rotatable about the axis of the circular hole 112.

A ratchet gear 114 is provided inside the gear portion 100. The ratchet gear 114 is attached to an adapter 116 which passes through the circular hole 96 of the bottom wall portion 94 and is disposed inside the gear portion 100. The adapter 116 is attached to the end portion of the torsion shaft on the side of the bridge plate 16 so as not to be rotatable relative to the torsion shaft, and the ratchet gear 114 is attached to the adapter 116 so as not to be rotatable relative to the adapter 116. Accordingly, the ratchet gear 114 is indirectly connected to the spool 18 via the adapter 116 and the torsion shaft so as not to be rotatable relative to the spool 18.

Figure 3:
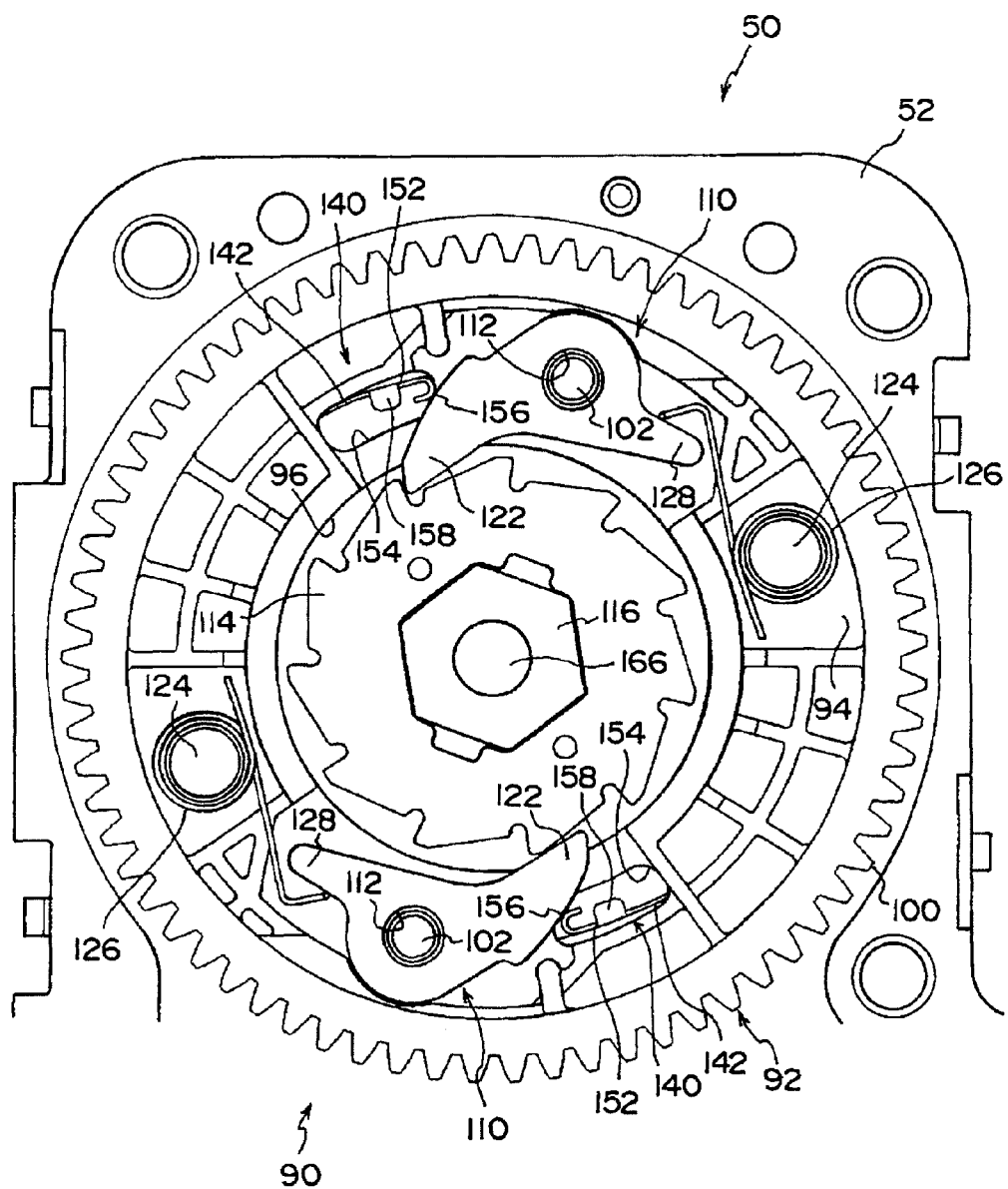
FIG. 3 is a side view illustrating a state where a rotation transmission member displaces to be able to transmit rotation to a spool and corresponding to FIG. 2.

External ratchet teeth are formed on the outer peripheral portion of the ratchet gear 114. A meshing portion 122 is formed at the connection pawl 110 so as to correspond to the ratchet teeth of the ratchet gear 114. When the connection pawl 110 rotates in one direction about the support shaft 102 that passes through the circular hole 112, the meshing portion 122 moves close to the outer peripheral portion of the ratchet gear 114 as shown in FIG. 3, and the meshing portion 122 meshes with the ratchet teeth of the ratchet gear 114. When the input gear 92 rotates in the winding direction about the support portion 98 while the meshing portion 122 meshes with the ratchet teeth of the ratchet gear 114, the meshing portion 122 of the connection pawl 110 rotating in the winding direction together with the input gear 92 presses the ratchet gear 114 in the winding direction, thereby rotating the ratchet gear 114 in the winding direction together with the input gear 92.

Here, the other support shaft 102 is formed to deviate from the one support shaft 102 by 180° about the rotation center of the input gear 92. On the contrary, the number of the external ratchet teeth formed on the ratchet gear 114 is set to be odd. Due to this configuration, when the meshing portion 122 of the connection pawl 110 supported by the one support shaft 102 meshes with the ratchet teeth of the ratchet gear 114, the meshing portion 122 of the connection pawl 110 supported by the other support shaft 102 contacts with the middle portion of the slope of the ratchet teeth in the rotary circumferential direction of the ratchet gear 114 so as not to mesh with the ratchet teeth. With such a configuration, when the ratchet gear 114 rotates by an angle corresponding to a half of an interval of the ratchet teeth, the meshing portion 122 of one connection pawl 110 meshes with the ratchet teeth of the ratchet gear 114.

On the other hand, support pins 124 are formed at the bottom wall portion 94 in the extracting direction along the rotary circumferential direction of the input gear 92 with respect to the support shaft 102. A return spring 126 is attached to each of the support pins 124. The return spring 126 is a helical spring, a middle portion of which is formed in a coil shape. One end of the return spring 126 is locked to a lock portion (not shown) formed at the bottom wall portion 94. On the contrary, the other end of the returning spring 126 comes into press contact with a spring contact portion 128 of the connection pawl 110, and urges the connection pawl 110 in the other direction about the support shaft 102, that is, a direction in which the meshing portion 122 moves away from the outer peripheral portion of the ratchet gear 114.

Figure 4:
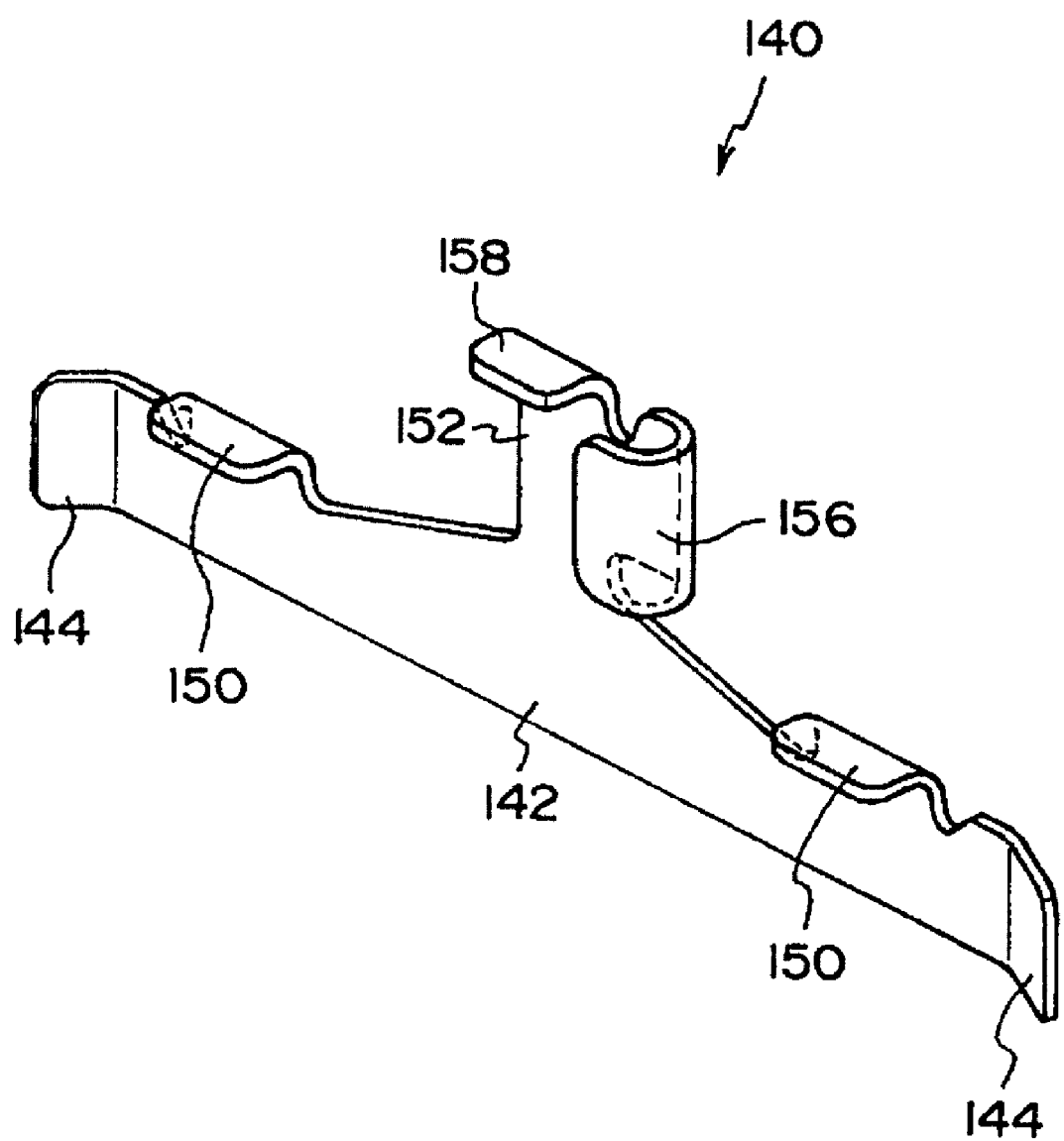
FIG. 4 is a perspective view illustrating a configuration of an interference member.
Figure 5:
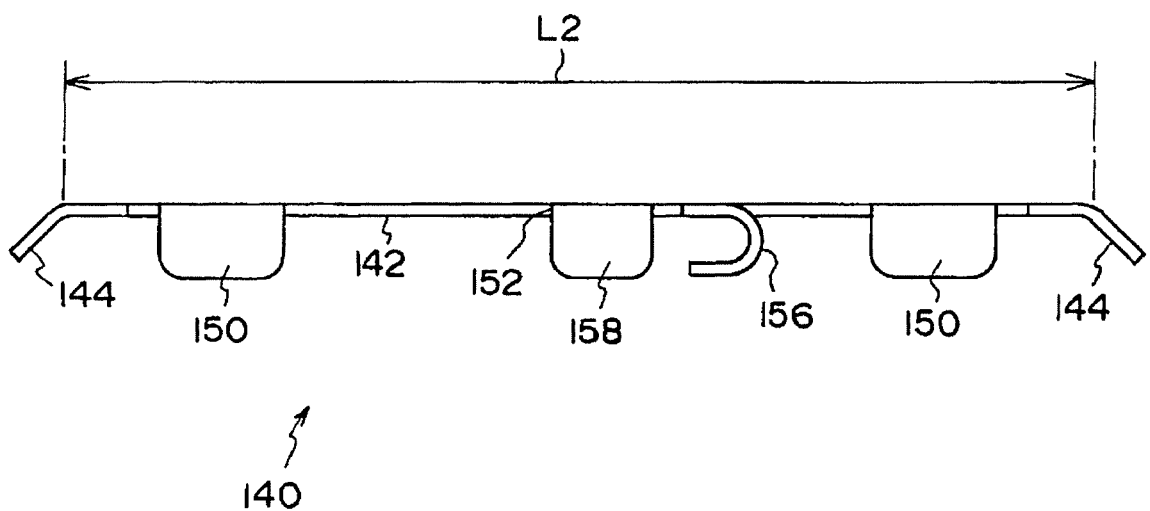
FIG. 5 is a plan view illustrating a configuration of the interference member.

The clutch 90 includes a pair of interference pieces 140 each of which serves as an interference member. As shown in FIGS. 4 and 5, the interference piece 140 includes a base portion 142 as a press contact portion. The base portion 142 is formed in a plate shape, the width direction of which is aligned with the height direction of the interference piece 140, that is, the axial direction of the spool 18. A bent portion 144 is formed at the vicinity of each of both longitudinal direction ends of the base portion 142. The bent portion 144 is formed by bending or curving the base portion 142 about an axis whouse axial direction is st to the width direction of the base portion 142 with one side in the thickness direction of the base portion 142 set as the curvature center.

Figure 6:
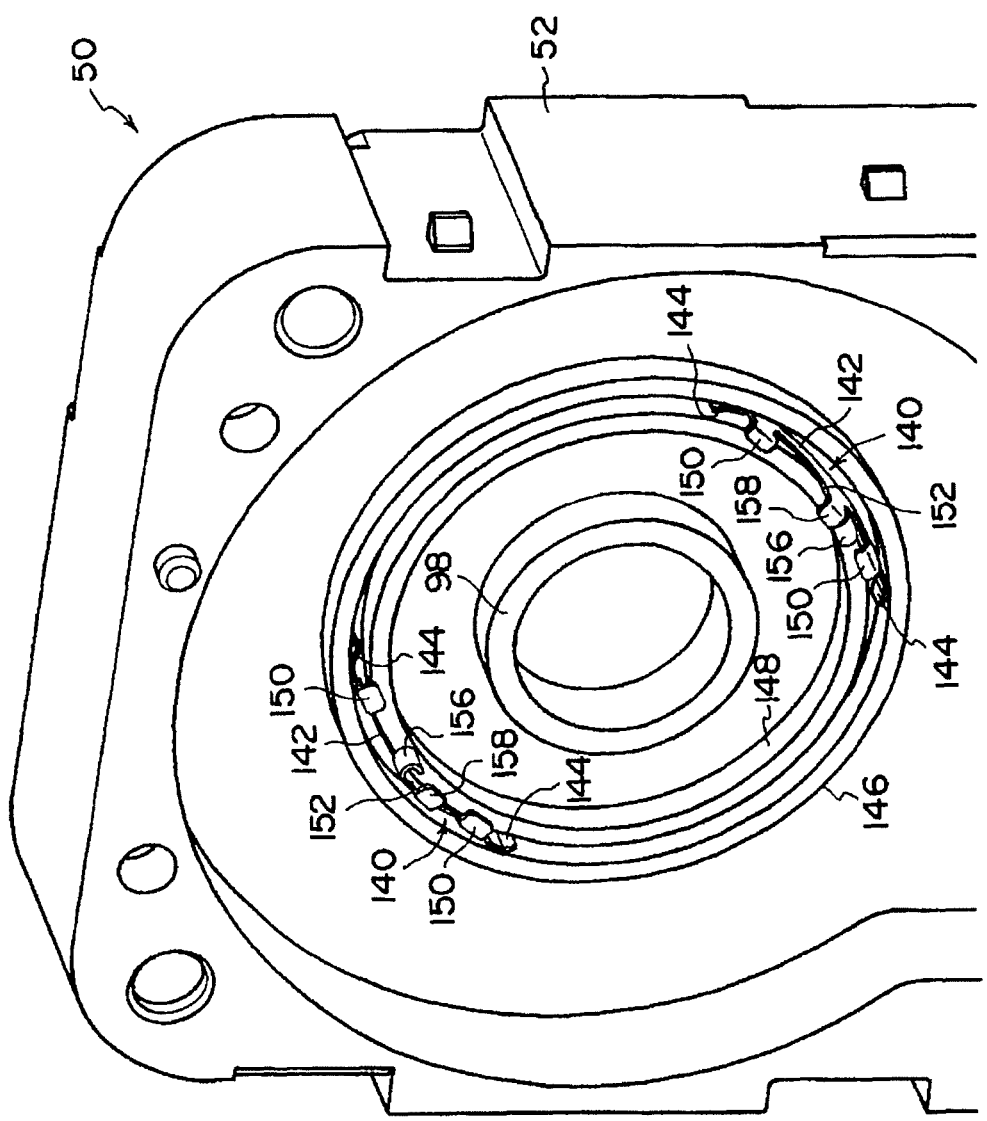
FIG. 6 is a perspective view illustrating a state where the interference member is attached to a retaining member.
Figure 7:
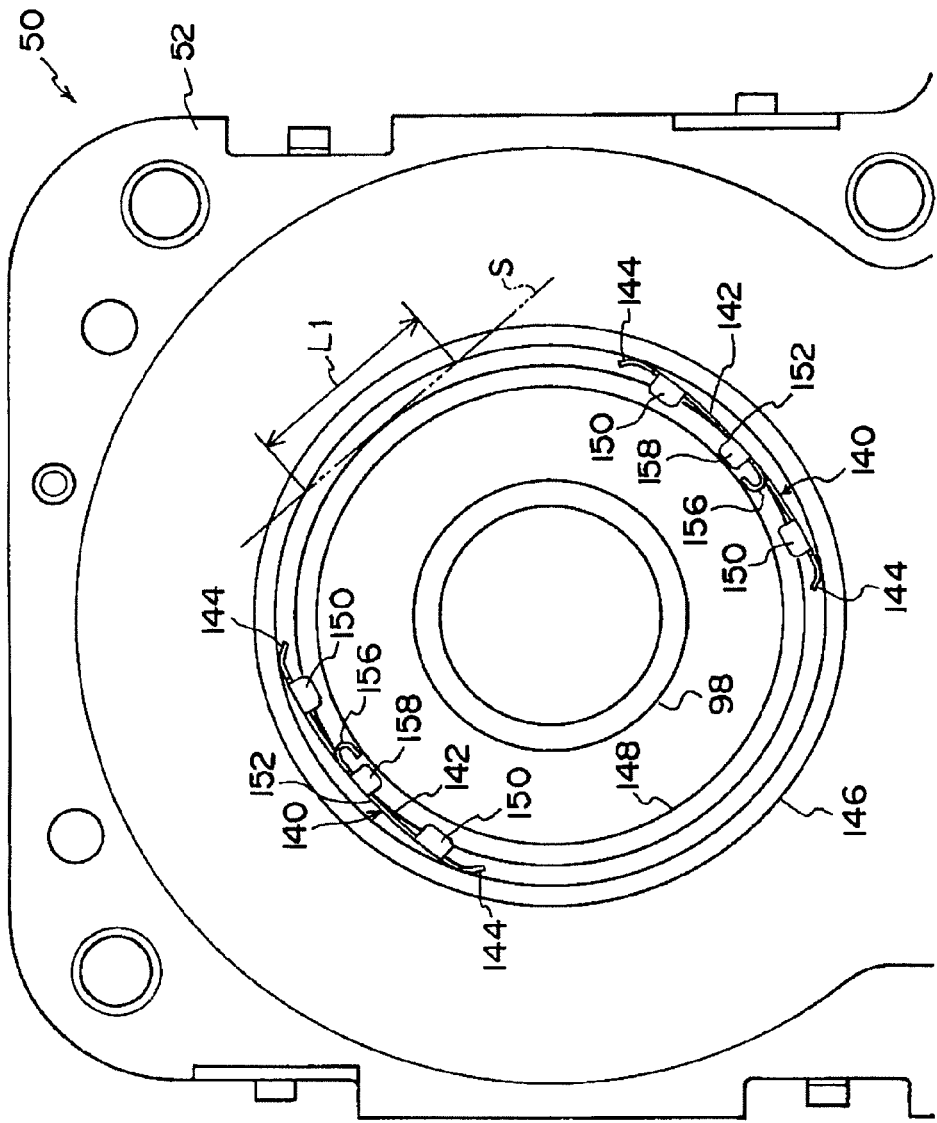
FIG. 7 is a side view illustrating a retaining member when the interference member is attached to the retaining member.

As shown in FIGS. 1, 6, and 7, an outer retaining ring 146 as a retaining portion is formed at the bottom portion of the gear box 52 so as to correspond to the base portion 142. The outer retaining ring 146 is formed in an annular shape so as to be coaxial with the support portion 98, and is uprightly formed from the bottom portion of the gear box 52 toward the opposite side from the bridge plate 16. An inner retaining ring 148 as a retaining portion is formed on the inside of the outer retaining ring 146 so as to be coaxial with the outer retaining ring 146. The inner retaining ring 148 is formed in an annular shape, the outer diameter of which is smaller than the inner diameter of the outer retaining ring 146. The inner retaining ring 148 is uprightly formed from the bottom portion of the gear box 52 toward the opposite side from the bridge plate 16.

The base portion 142 of the interference piece 140 is disposed between the outer retaining ring 146 and the inner retaining ring 148 so that one side in the thickness direction of the base portion 142 (that is, the side where the curvature center of the bent portion 144 is located) faces the outer peripheral portion of the inner retaining ring 148. As shown in FIGS. 4 and 5, although the base portion 142 is formed in a flat plate shape, a length L1 is shorter than a length L2, where the length L1 is a length from an intersection point with the inner peripheral portion of the outer retaining ring 146 on one end side of an imaginary tangential line S (refer to FIG. 7) contacting the outer peripheral portion of the inner retaining ring 148 to an intersection point with the inner peripheral portion of the outer retaining ring 146 on the other end side, and the length L2 is a length from the bending portion of the bent portion 144 on one side in the longitudinal direction of the base portion 142 to the bending portion of the bent portion 144 on the other side.

Due to this configuration, the base portion 142 disposed between the outer retaining ring 146 and the inner retaining ring 148 is curved about the axis, the axial direction of which is the width direction of the base portion, while resisting the spring characteristics so that the center side of the outer retaining ring 146 on the outside of the base portion 142 becomes the curvature center. Accordingly, the base portion 142 comes into press contact with the outer peripheral portion of the inner retaining ring 148 at the longitudinal direction center portion of the base portion 142 and the vicinity thereof, and the bending portions of the bent portions 144 in both longitudinal direction end portions of the base portion 142 come into press contact with the inner peripheral portion of the outer retaining ring 146.

A shoulder piece 150 is formed at one end in the width direction of the base portion 142, that is, the end portion in the width direction of the base portion 142 on the opposite side from the bottom portion of the support portion 98 while the base portion 142 is disposed between the outer retaining ring 146 and the inner retaining ring 148. The shoulder piece 150 is formed in a flat plate shape, the thickness direction of which is substantially aligned with the width direction of the base portion 142. The shoulder piece 150 is formed by bending a flat-plate-shaped base material forming the interference piece 140 toward one direction in the thickness direction of the base portion 142. As shown in FIG. 6, in the state where the base portion 142 is disposed between the outer retaining ring 146 and the inner retaining ring 148 to attach the interference piece 140 to the support portion 98, one surface in the thickness direction of the shoulder piece 150, that is, the surface facing the bottom portion of the support portion 98 contacts with the front end of the inner retaining ring 148 (that is, the end portion of the inner retaining ring 148 on the opposite side from the bottom portion of the support portion 98).

Here, the dimension of the width of the base portion 142, that is, the dimension in the width direction of the base portion 142 from one surface in the thickness direction of the shoulder piece 150 to the other end portion in the width direction of the base portion 142 (the end portion in the width direction of the base portion 142 facing the bottom portion side of the support portion 98 while the base portion 142 is disposed between the outer retaining ring 146 and the inner retaining ring 148) is set to be shorter than the dimension of the inner retaining ring 148 protruding from the bottom portion of the support portion 98 (that is, the length of the inner retaining ring 148 from the end portion of the inner retaining ring 148 on the bottom portion side of the support portion 98 to the end portion of the inner retaining ring 148 on the opposite side from the bottom portion of the support portion 98). Due to this configuration, since the shoulder piece 150 contacts with the front end of the inner retaining ring 148, the end portion of the base portion 142 on the opposite side from the shoulder piece 150 (that is, the end portion in the width direction of the base portion 142 facing the bottom portion side of the support portion 98) is separated from the bottom portion of the support portion 98.

Figure 2:
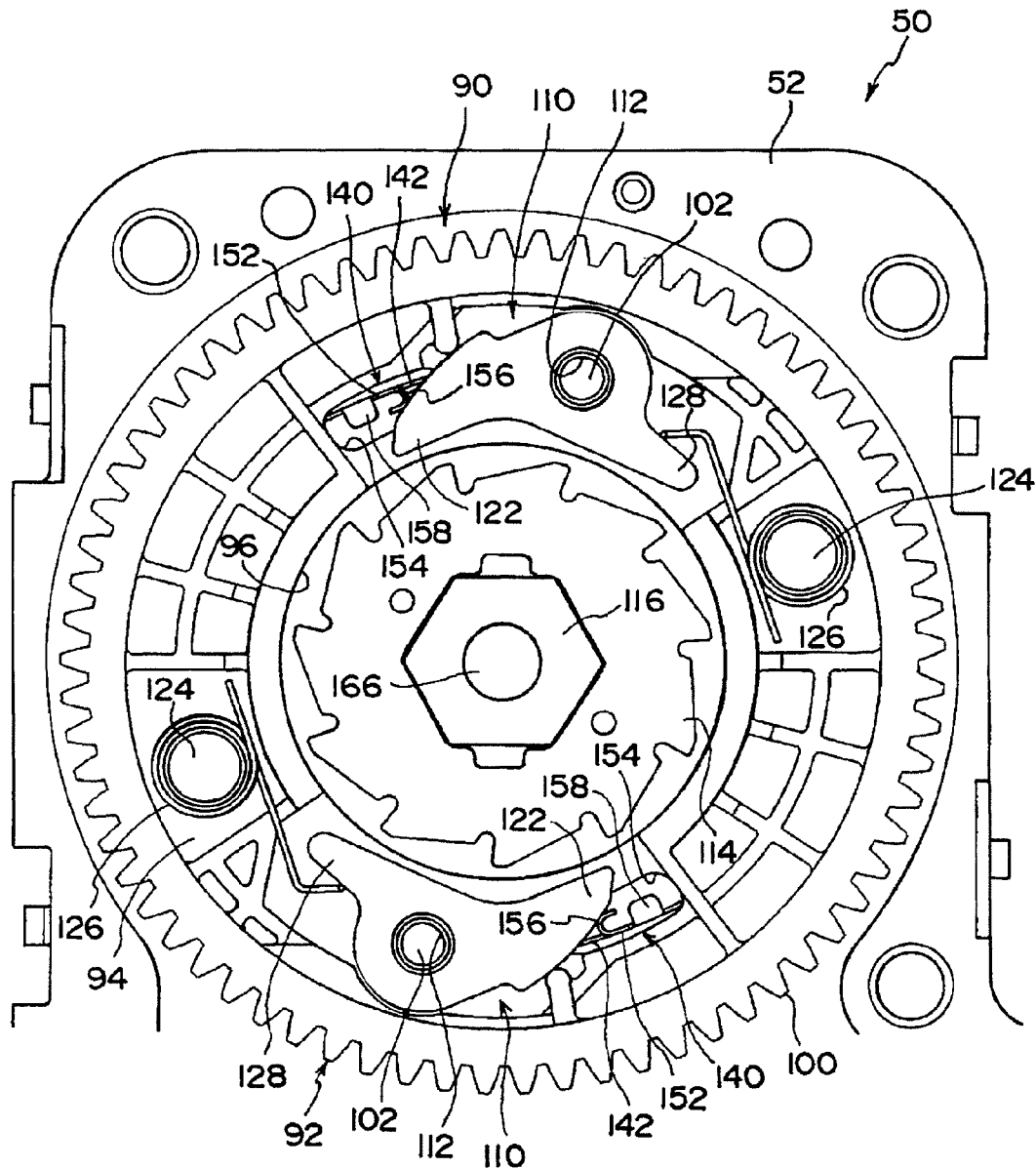
FIG. 2 is an enlarged side view illustrating a configuration of a main part of the webbing winding device according to the first exemplary embodiment of the invention.

An interference portion 152 extends from the longitudinal direction center side of the base portion 142 at one end portion in the width direction of the base portion 142. As shown in FIGS. 2 and 3, a perforation hole 154 is formed at the bottom wall portion 94 of the input gear 92 so as to correspond to the interference portion 152. The perforation hole 154 is formed at the vicinity of the meshing portion 122 of the connection pawl 110 supported by the support shaft 102. In the interference piece 140 having the base portion 142 disposed between the outer retaining ring 146 and the inner retaining ring 148, the interference portion 152 passes through the perforation hole 154, and particularly, the interference portion 152 faces the meshing portion 122 in the winding direction of the meshing portion 122 along the rotary circumferential direction of the input gear 92 when the interference piece 140 is in the initial state. The side closer to the extracting direction than the middle portion of the interference portion 152 along the rotary circumferential direction of the input gear 92 is formed as a curved portion 156. The curved portion 156 is formed by curving the interference portion 152 in a substantially U-shape about an axis whose axial direction is the width direction of the interference portion 152.

Further, as shown in FIGS. 4 and 5, a shoulder piece 158 is formed at the interference portion 152 on the opposite side from the base portion 142. The shoulder piece 158 is formed by bending or curving the front end side (the opposite side from the base portion 142) which is further frontward than the middle portion of the interference portion 152 along the height direction of the interference piece 140 about an axis whose axial direction is the width direction of the interference portion 152 (the longitudinal direction of the base portion 142). The thickness direction of the shoulder piece 158 is substantially aligned with the height direction of the interference piece 140, that is, the axial direction of the spool 18.

On the other hand, as shown in FIG. 1, a blocking plate 162 is provided at an opening end of the gear box 52 on the opposite side from the bridge plate 16. The blocking plate 162 is integrally attached to the gear box 52 by the use of a fastening member such as a bolt or screw (not shown). The blocking plate 162 attached to the gear box 52 blocks the opening of the gear box 52 on the opposite side from the bridge plate 16, and regulates the separation of the two-staged gears 60 and 70, the gear 80, or the input gear 92 (clutch 90). In addition, since the blocking plate 162 attached to the gear box 52 not only blocks the opening of the gear box 52, but also blocks the side of the input gear 92 accommodating the connection pawl 110 or the return spring 126, the separation of the connection pawl 110 or the return spring 126 from the inside of the input gear 92 is regulated.

Here, as for the formation position of the shoulder piece 158 or the dimension of the interference portion 152 extending from the base portion 142, a gap between the shoulder piece 158 and the blocking plate 162 along the axial direction of the spool 18 while the shoulder piece 150 contacts with the inner retaining ring 148 is formed to be shorter than a gap from the other end portion in the width direction of the base portion 142 (the end portion in the width direction of the base portion 142 facing the bottom portion side of the support portion 98) to the shoulder piece 150 along the axial direction of the spool 18.

A perforation hole 164 is formed at the blocking plate 162 so as to perforate the blocking plate 162 in the thickness direction. A shaft portion 166 protruding from the adapter 116 to be coaxial with the spool 18 passes through the perforation hole 164, and protrudes toward the outside of the blocking plate 162. A spring housing 172 is provided at the outside of the blocking plate 162 (in the blocking plate 162 on the opposite side from the gear box 52).

The spring housing 172 is integrally connected to the gear box 52. The shaft portion 166 passing through the perforation hole 164 is disposed inside the spring housing 172, and is rotatably supported to a bearing portion (not shown) formed inside the spring housing 172. In addition, a helical spring (not shown) is accommodated in the spring housing 172. The end portion on the outside of the helical direction of the helical spring is directly or indirectly locked to the spring housing 172, and the end portion on the inside of the helical direction is directly or indirectly locked to the shaft portion 166 disposed in the spring housing 172.

The helical spring is wound and tightened when the shaft portion 166 is rotated in the extracting direction, and urges the shaft portion 166 in the winding direction. When the webbing belt 20 extracted from the spool 18 in a normal state is wound and accommodated in the spool 18, the helical spring rotates the spool 18 in the winding direction by the use of its urging force.

Effect and Advantage of First Exemplary Embodiment

Next, the effect and advantage of the exemplary embodiment will be described by describing the operation of the webbing winding device 10.

In the webbing winding device 10, when the ECU determines that a distance with respect to another vehicle traveling in front of the own vehicle or an obstacle in front of the own vehicle is less than a predetermined value on the basis of electrical signals output from the forward monitoring device, the ECU operates the motor 40 by supplying a current to the motor 40. When the output shaft 42 is rotated in accordance with the operation of the motor 40, the gear 56 provided at the output shaft 42 rotates the two-staged gear 60 by transmitting the rotation of the output shaft 42 to the large diameter gear 62 of the two-staged gear 60. In addition, since the small diameter gear 64 of the two-staged gear 60 meshes with the large diameter gear 72 of the two-staged gear 70, the rotation of the two-staged gear 60 is transmitted to the two-staged gear 70, thereby rotating the two-staged gear 70. The rotation of the two-staged gear 70 is transmitted to the gear 80 meshing with the small diameter gear 74, and is transmitted to the gear portion 100 meshing with the gear 80 in a deceleration state, thereby rotating the input gear 92 in the winding direction.

Since the input gear 92 is rotated in the winding direction, the support shaft 102 formed at the bottom wall portion 94 of the input gear 92 is rotated in the winding direction, thereby rotating the connection pawl 110 supported by the support shaft 102 in the winding direction together with the input gear 92. Here, as described above, since the interference portion 152 of the interference piece 140 is located on the side of the winding direction of the meshing portion 122 constituting the connection pawl 110 in the initial state, when the connection pawl 110 is rotated in the winding direction together with the input gear 92, the meshing portion 122 contacts with the curved portion 156 of the interference portion 152 so as to press the curved portion 156 in the winding direction.

In the interference piece 140, the base portion 142 is disposed between the outer retaining ring 146 and the inner retaining ring 148 in a curved state while resisting its elasticity, the longitudinal direction middle portion of the base portion 142 comes into press contact with the inner retaining ring 148, and then both longitudinal direction end sides of the base portion 142 (that is, the bending portions of the bent portions 144) come into press contact with the outer retaining ring 146. Due to this configuration, when the base portion 142 is not pressed by a force more than the maximum static frictional force at the contact portion between the base portion 142 and the outer retaining ring 146 and the contact portion between the base portion 142 and the inner retaining ring 148, the base portion 142 does not move in the circumferential direction between the outer retaining ring 146 and the inner retaining ring 148.

Since the meshing portion 122 of the connection pawl 110 receives a pressing reaction force from the curved portion 156 of the interference piece 140 in this state, the connection pawl 110 is rotated about the support shaft 102 while resisting the urging force of the return spring 126, and the meshing portion 122 moves close to the outer peripheral portion of the ratchet gear 114. Since each connection pawl 110 is rotated as described above, when the meshing portion 122 of one connection pawl 110 meshes with the ratchet teeth of the ratchet gear 114 as shown in FIG. 3, the meshing portion 122 presses the ratchet teeth of the ratchet gear 114 in the winding direction.

Further, in this state, since further rotation of the connection pawl 110 is regulated, the meshing portion 122 of the connection pawl 110 keeps pressing the curved portion 156 of the interference piece 140. Accordingly, when the pressing force in the winding direction applied to the curved portion 156 of the interference piece 140 is more than the maximum static frictional force at the contact portion between the base portion 142 and the outer retaining ring 146 and the contact portion between the base portion 142 and the inner retaining ring 148, the interference piece 140 is guided by the outer retaining ring 146 and the inner retaining ring 148 to be rotated in the winding direction.

Accordingly, the input gear 92 is further rotated in the winding direction, and the rotation of the input gear 92 in the winding direction is transmitted to the ratchet gear 114 via the connection pawl 110, thereby rotating the ratchet gear 114 in the winding direction. Since the ratchet gear 114 is connected to the spool 18 via the adapter 116 and the torsion shaft so as not to be rotatable relative to the spool 18, the spool 18 is rotated in the winding direction when the ratchet gear 114 is rotated in the winding direction. Likewise, since the spool 18 is rotated in the winding direction, the webbing belt 20 is wound around the spool 18, thereby removing slight looseness, or so-called "slack" of the webbing belt 20 fastened to a body of a passenger of the vehicle.

However, in the webbing winding device 10, as described above, the curved portion 156 of the interference piece 140 presses the meshing portion 122 of the connection pawl 110 by rotating the input gear 92 in the winding direction relative to the interference piece 140, whereby the meshing portion 122 of the connection pawl 110 meshes with the ratchet teeth of the ratchet gear 114. However, in the webbing winding device 10, since the base portion 142 is retained by the outer retaining ring 146 and the inner retaining ring 148, the interference piece 140 is rotated relative to the input gear 92 when the input gear 92 is rotated in the winding direction. Accordingly, a brake mechanism for generating the rotation of the interference piece 140 relative to the input gear 92 may not be particularly provided.

Further, for example, a pressing member that presses the meshing portion 122 of the connection pawl 110 in the extracting direction when the input gear 92 is rotated in the winding direction may be clamped between the bottom wall portion 94 of the input gear 92 and the blocking plate 162 so as to generate the rotation of the pressing member relative to the input gear 92 by the friction generated in the pressing member due to such a clamping operation. However, in this configuration, the magnitude of friction generated in the pressing member changes due to assembling error of the input gear 92 with respect to the gear box 52 or assembling error of the blocking plate 162 with respect to the gear box 52.

On the contrary, in the webbing winding device 10, since both the outer retaining ring 146 and the inner retaining ring 148 generating friction with respect to the base portion 142 of the interference piece 140 are formed at the gear box 52, errors involved with the shape of the outer retaining ring 146 or the inner retaining ring 148 and the relative positional relationship between the outer retaining ring 146 and the inner retaining ring 148 are small. Accordingly, a difference in the magnitude of friction generated between the outer retaining ring 146 or the inner retaining ring 148 and the base portion 142 that is disposed between the outer retaining ring 146 and the inner retaining ring 148 in a curved state while resisting its elasticity (spring characteristics) may be small.

In the webbing winding device 10, the shoulder pieces 150 and 158 or the curved portion 156 and the bent portion 144 are formed at the interference piece 140. However, since the interference piece 140 is basically formed in a flat plate shape, the interference piece 140 may be easily formed by punching, for example, a flat metal plate. Further, since the shoulder pieces 150 and 158 or the curved portion 156 and the bent portion 144 may be formed by the punching, the cost is cheap.

Further, for example, when the base portion 142 is formed to be curved in the state where the base portion 142 is not yet disposed between the outer retaining ring 146 and the inner retaining ring 148, the curved state of the base portion 142 needs to be adjusted in order to obtain constant friction when the base portion 142 is disposed between the outer retaining ring 146 and the inner retaining ring 148. However, in the webbing winding device 10, the base portion 142 is formed in a flat plate shape, which is not curved except for the bent portion 144, in the state where the base portion 142 is not yet disposed between the outer retaining ring 146 and the inner retaining ring 148. Due to this configuration, the particular adjustment described above is not needed, and hence defective products rarely occur. Accordingly, the cost may be decreased thanks to this benefit.

In the webbing winding device 10, the bent portion 144 is formed at the base portion 142, the bending portion of the bent portion 144 contacts with the inner peripheral portion of the outer retaining ring 146, and then the edges (corner portions) of both longitudinal direction end surfaces (end portions) of the base portion 142 do not contact with the inner peripheral portion of the outer retaining ring 146. Accordingly, friction generated with respect to the inner peripheral portion of the outer retaining ring 146 does not increase excessively. Further, since the interference piece 140 is rotated while being guided by the outer retaining ring 146 and the inner retaining ring 148, the edges (corner portions) of both longitudinal direction end surfaces (end portions) of the base portion 142 are not caught by the inner peripheral portion of the outer retaining ring 146, thereby preventing problems such as needless bent portions being formed at both longitudinal direction end sides of the base portion 142 or the inner peripheral surface of the outer retaining ring 146 being cut. Accordingly, satisfactory operation performance of the clutch 90 may be maintained for a long period of time.

The dimension of the width of the base portion 142 is set to be shorter than the dimension of the inner retaining ring 148 protruding from the bottom portion of the support portion 98, and the shoulder piece 150 contacts with the front end of the inner retaining ring 148, thereby separating the end portion of the base portion 142 on the opposite side from the shoulder piece 150 (that is, the end portion in the width direction of the base portion 142 facing the bottom portion side of the support portion 98) from the bottom portion of the support portion 98. Accordingly, even when the interference piece 140 is rotated while being pressed by the meshing portion 122 of the connection pawl 110, the edge of the end portion of the base portion 142 on the opposite side from the shoulder piece 150 is not caught by the bottom portion of the gear box 52, thereby smoothly rotating the interference piece 140 pressed by the meshing portion 122 of the connection pawl 110.

The curved portion 156 of the interference portion 152 of the interference piece 140 is adapted to contact with the meshing portion 122 of the connection pawl 110. Since the curved portion 156 is curved as described above, even when the direction of the contact portion of the meshing portion 122 with respect to the curved portion 156 changes as the connection pawl 110 rotates about the support shaft 102, the edge of the end portion of the interference portion 152 does not contact with the meshing portion 122. Accordingly, the connection pawl 110 receiving a pressing reaction force from the curved portion 156 may be smoothly rotated.

In the webbing winding device 10, when the shoulder piece 150 contacts with the inner retaining ring 148, a gap between the shoulder piece 158 and the blocking plate 162 is shorter than a gap from the other end portion in the width direction of the base portion 142 (the end portion in the width direction of the base portion 142 facing the bottom portion side of the support portion 98) to the shoulder piece 150 along the axial direction of the spool 18. Accordingly, even when the interference piece 140 moves to be separated from the bottom portion of the gear box 52 until the shoulder piece 158 contacts with the blocking plate 162, the base portion 142 does not come off from a gap between the outer retaining ring 146 and the inner retaining ring 148.

Likewise, in the webbing winding device 10, even when the interference piece 140 moves so that the base portion 142 is separated from the base portion of the gear box 52 due to, for example, vibration or the like generated when the vehicle travels, the base portion 142 does not come off from the gap between the outer retaining ring 146 and the inner retaining ring 148, thereby maintaining the satisfactory operation performance of the interference piece 140 for a long period of time.

In the exemplary embodiment, the outer retaining ring 146 and the inner retaining ring 148 are formed at the bottom portion of the gear box 52, the outer retaining ring 146 and the inner retaining ring 148 may be formed at the blocking plate 162.

Further, in the first exemplary embodiment, the curved portion 156 is located on the winding direction side of the meshing portion 122 (connection pawl 110) in the initial state of the interference piece 140, the meshing portion 122 is interfered with the curved portion 156 when the input gear 92 is rotated in the winding direction, and the connection pawl 110 is rotated by a pressing reaction force applied from the curved portion 156.

However, the invention is not limited to such a configuration. For example, the meshing portion 122 may mesh with the ratchet teeth of the ratchet gear 114 in such a manner that the interference piece 140 as the interference member interferes with the connection pawl 110 as the rotation transmission member in the initial state, the meshing portion 122 is maintained so as not to mesh with the ratchet teeth of the ratchet gear 114, and the connection pawl 110 is rotated in the winding direction together with the input gear 92 so as to remove the interference of the interference piece 140 with respect to the connection pawl 110.

An example thereof will be described as a second exemplary embodiment of the invention with reference to FIGS. 8 and 9.

Second Exemplary Embodiment

Figure 8:
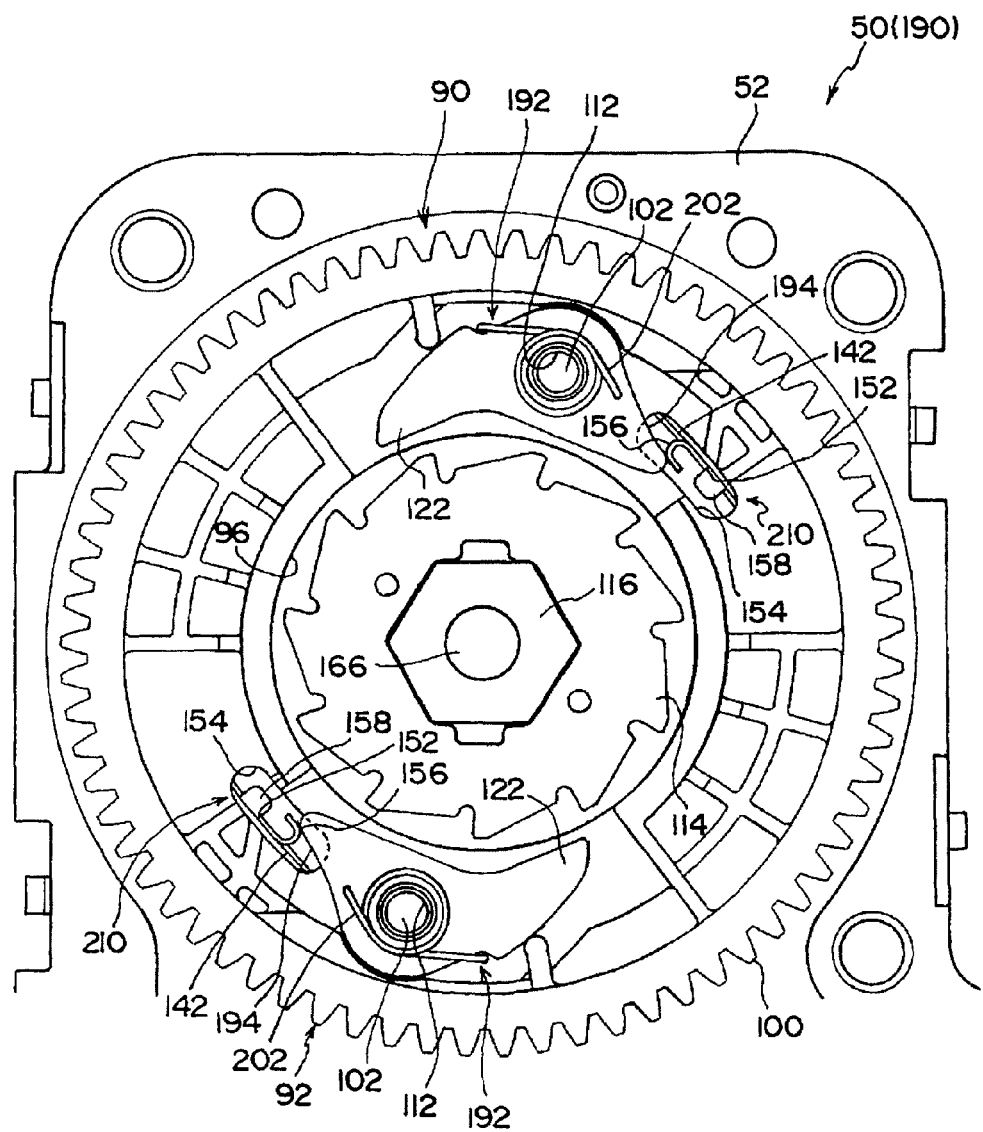
FIG. 8 is an enlarged side view illustrating a configuration of a main part of the webbing winding device according to a second exemplary embodiment of the invention.
Figure 9:
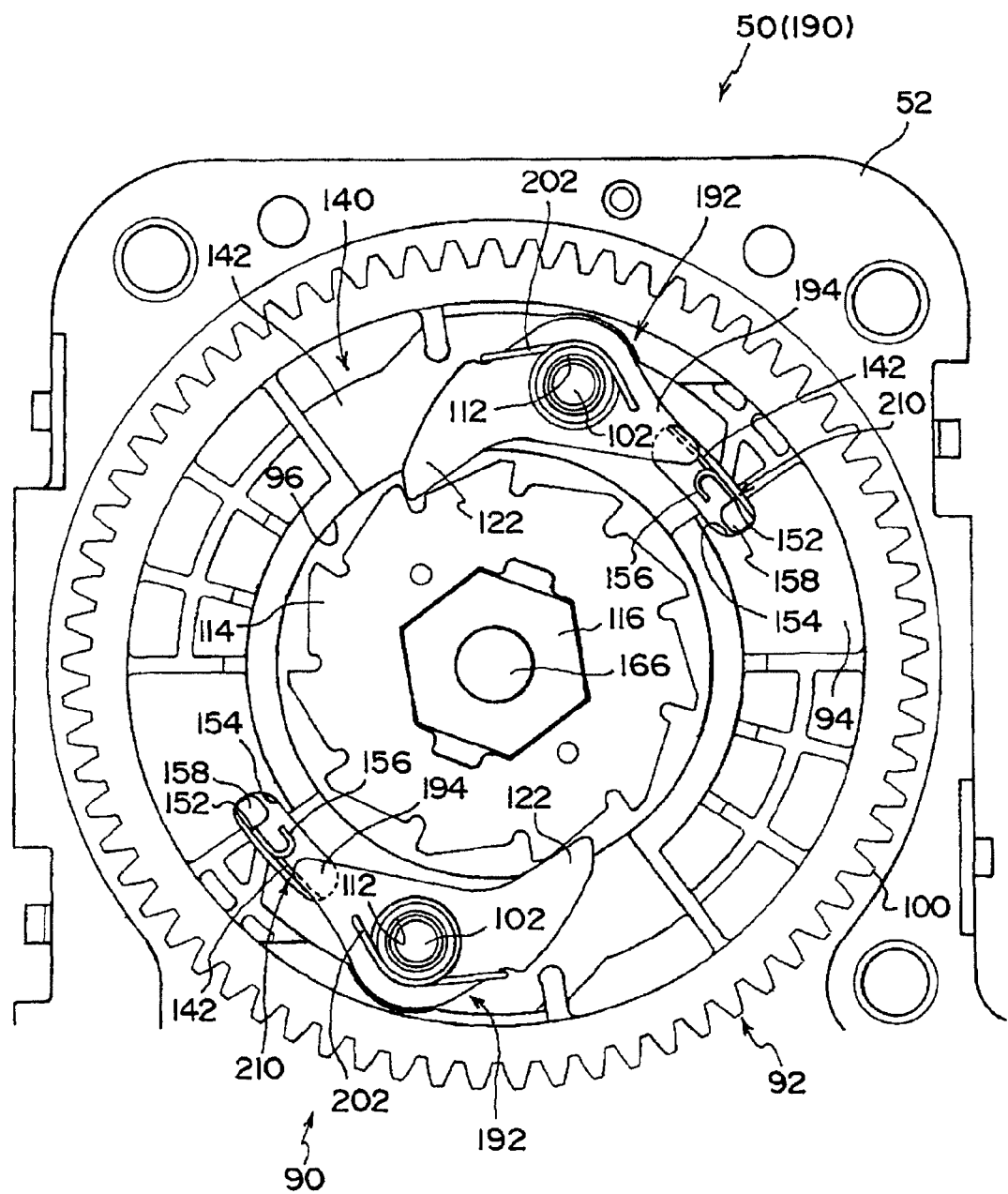
FIG. 9 is a side view illustrating a state where the rotation transmission member displaces to be able to transmit rotation to the spool and corresponding to FIG. 8.

The configuration of a main part of a webbing winding device 190 according to a second exemplary embodiment of the invention is shown in the side view of FIG. 8.

As shown in the drawing, the webbing winding device 190 does not include the connection pawl 110. However, a connection pawl 192 as a rotation transmission member is attached to each support shaft 102. The connection pawl 192 is the same as the connection pawl 110 in that the meshing portion 122 is provided. However, the spring contact portion 128 is not provided, and an interference target portion 194 is provided instead of the spring contact portion 128.

Further, the webbing winding device 190 includes a connection urging spring 202 instead of the return spring 126. The connection urging spring 202 is a helical spring, the middle portion of which is formed in a coil shape as in the return spring 126. The coil-shaped portion is attached to the support shaft 102 of each connection pawl 192. One end of the connection urging spring 202 is locked to a lock portion (not shown) formed at the bottom wall portion 94. On the contrary, the other end of the connection urging spring 202 comes into press contact with the meshing portion 122 of the connection pawl 192, and urges the connection pawl 192 in a direction in which the meshing portion 122 moves close to the outer peripheral portion of the ratchet gear 114.

Furthermore, the webbing winding device 190 includes an interference piece 210 as an interference member instead of the interference piece 140. The interference piece 210 basically has the same configuration as that of the interference piece 140 of the first embodiment. However, while the interference piece 140 has a configuration in which the curved portion 156 is set on the side closer to the extracting direction than the middle portion of the interference portion 152, the interference piece 210 has a configuration in which the curved portion 156 is set on the side closer to the winding direction than the middle portion of the interference portion 152. The interference piece 210 has the interference portion 152 passing through the perforation hole 154 and located on the side of the extracting direction of the interference target portion 194 of the connection pawl 192, and particularly, the curved portion 156 interferes with the interference target portion 194 in the initial state of the interference piece 210, whereby the meshing portion 122 of the connection pawl 192 retains the connection pawl 192 while being separated from the outer peripheral portion of the ratchet gear 114 against the urging force of the connection urging spring 202.

In the exemplary embodiment with the above-described configuration, the interference target portion 194 is separated from the curved portion 156 of the interference piece 210 when the connection pawl 192 is rotated in the winding direction together with the input gear 92. In this way, when the connection pawl 192 is rotated together with the input gear 92 up to the position that does not interfere with the curved portion 156 of the interference piece 210, the connection pawl 192 is rotated by the urging force of the connection urging spring 202, and the meshing portion 122 meshes with the ratchet teeth formed at the outer peripheral portion of the ratchet gear 114 as shown in FIG. 9.

On the other hand, when the input gear 92 is rotated in the extracting direction while the ratchet teeth of the ratchet gear 114 mesh with the meshing portion 122, the interference target portion 194 of the connection pawl 192 contacts with the curved portion 156 of the interference piece 210. In this state, when the connection pawl 192 is further rotated in the extracting direction together with the input gear 92, the interference target portion 194 of the connection pawl 192 pressing the curved portion 156 of the interference piece 210 in the extracting direction receives a pressing reaction force from the curved portion 156 of the interference piece 210 as in the case where the meshing portion 122 of the connection pawl 110 of the first exemplary embodiment comes into press contact with the curved portion 156 of the interference piece 140.

Likewise, since the interference target portion 194 of the connection pawl 192 receives the pressing reaction force from the curved portion 156 of the interference piece 140, the interference target portion is rotated about the support shaft 102 while resisting the urging force of the connection urging spring 202, and the meshing portion 122 is separated from the outer peripheral portion of the ratchet gear 114 so as to be retained by the curved portion 156 of the interference piece 140 in this state.

Here, in the exemplary embodiment performing the above-described embodiment, the interference piece 210 substantially has the same configuration as that of the interference piece 140 except that the formation position of the curved portion 156 in the interference portion 152 is different from that of the first exemplary embodiment.

Accordingly, even in the exemplary embodiment, since basically the same effect as that of the first embodiment is performed, the same advantage as that of the first exemplary embodiment may be obtained.

The invention claimed is:

1. A webbing winding device comprising:
    a spool to which a longitudinal direction base end side of a webbing belt is fixed and which rotates in a winding direction so that the webbing belt is wound from the longitudinal direction base end side;
    a frame which directly or indirectly supports the spool;
    a motor which is operated to rotate an output shaft;
    a rotating body which rotates when rotation of the output shaft is transferred thereto;
    a rotation transmission member which is provided at the rotating body so as to be displaceable relative to the rotating body, to thereby displace so as to be directly or indirectly connected to the spool, and transmit rotation of the rotating body to the spool;
    a retaining member which includes a pair of retaining portions facing each other in a rotary radial direction of the rotating body and is mounted to the frame; and
    an interference member which is provided between the pair of retaining portions so as to be elastically retained by the retaining portions in a press contact state and to be moved in a rotary circumferential direction of the rotating body by being guided by the pair of retaining portions when receiving a predetermined magnitude or more of a pressing force in the rotary circumferential direction, and which is disposed on the side of the rotation transmission member in a rotary direction of the rotating body so as to interfere with the rotation transmission member or to release interference with respect to the rotation transmission member to thereby permit displacement of the rotation transmission member in a direction in which the rotation transmission member is connected to the spool when the rotating body rotates in the winding direction.

2. The webbing winding device of claim 1, wherein the interference member comprises:
    a press contact portion which is formed in a flat plate shape and is curved against elasticity of the press contact portion while being disposed between the pair of retaining portions so that both longitudinal direction end sides come into press contact with one of the pair of retaining portions; and
    an interference portion which is formed in a plate shape having a thickness direction thereof along the thickness direction of the press contact portion and extends from the press contact portion so that the interference portion is able to interfere with the rotation transmission member.

3. The webbing winding device of claim 1,
    wherein the pair of retaining portions is uprightly formed from the retaining member in a rotary shaft direction of the rotating body,
    wherein an abutment portion is provided at the interference member so that a surface of the abutment portion contacts with a front end of at least one of the pair of retaining portions in an upright direction from the retaining member, and
    wherein a length in the upright direction from an end portion of the interference member on the opposite side from the front ends of the pair of retaining portions in the upright direction to the contact surface of the abutment portion contacting with the front ends of the pair of retaining portions is set to be shorter than a length of the pair of retaining portions in the upright direction.

* * * * *